US 6,532,037 B1

(12) United States Patent
Shimura

(10) Patent No.: US 6,532,037 B1
(45) Date of Patent: Mar. 11, 2003

(54) CAMERA SYSTEM WHEREIN RECORDING MEDIUM IN CAMERA STORES INFORMATION ON ANGLE OF VIEW OF PHOTOGRAPHING OF IMAGE NECESSARY FOR CYLINDRICAL CONVERSION

(75) Inventor: Kazuhiko Shimura, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/419,418

(22) Filed: Oct. 15, 1999

(30) Foreign Application Priority Data

Oct. 16, 1998 (JP) .......................................... 10-295370

(51) Int. Cl.[7] ................................................ H04N 7/00
(52) U.S. Cl. ........................................................ 348/36
(58) Field of Search ............................ 348/36, 38, 335; 382/284

(56) References Cited

U.S. PATENT DOCUMENTS 5,023,725 A * 6/1991 McClutchen ................ 358/231
5,818,527 A * 10/1998 Yamaguchi et al. ......... 348/335
6,031,541 A * 2/2000 Lipscomb et al. ........... 345/425
6,064,399 A * 5/2000 Teo ............................. 345/435
6,157,747 A * 12/2000 Szeliski et al. .............. 382/284
6,337,708 B1 * 1/2002 Furlan et al. .................. 348/36

FOREIGN PATENT DOCUMENTS

JP 6-141228 5/1994
JP 11-205648 7/1999

* cited by examiner

Primary Examiner—Chris Kelley
Assistant Examiner—George Bugg
(74) Attorney, Agent, or Firm—Straub & Pokotylo; John C. Pokotylo

(57) ABSTRACT

A camera system comprises a camera and a panoramic image synthesizing apparatus. The camera includes a photographing device for photographing an object, and a recording medium for storing divisional images of the object photographed by the photographing device and information relating to an angle of view of photographing. The panoramic image synthesizing apparatus performs a cylindrical conversion process based on the divisional images stored in the recording medium and the information relating to the angle of view, and synthesizing cylindrically converted images, thereby producing a panoramic image.

2 Claims, 3 Drawing Sheets

IMAGE A   IMAGE B   IMAGE C

CAMERA SYSTEM WHEREIN RECORDING MEDIUM IN CAMERA STORES INFORMATION ON ANGLE OF VIEW OF PHOTOGRAPHING OF IMAGE NECESSARY FOR CYLINDRICAL CONVERSION

BACKGROUND OF THE INVENTION

The present invention relates to a camera system and a recording medium.

In a conventionally-known camera system, a plurality of divisional images of an object are continuously photographed (hereinafter referred to as panoramic photography), and the divisional images are pasted to produce one continuous image (hereinafter referred to as a panoramic image). When a panoramic image is produced, if a plurality of images are simply pasted, the obtained panoramic image is unnatural and low in paste-up accuracy. To avoid this, an image synthesizing apparatus for producing a more. natural panoramic image by means of a cylindrical conversion process is proposed. In the cylindrical conversion process, pieces of divisional image information are projected on an imaginary cylindrical plane of a photographed image, so that a more natural panoramic image can be produced.

FIG. 2 is a diagram for explaining a basic principle of the cylindrical conversion process.

In FIG. 2, a reference symbol R denotes an object, and a reference symbol O denotes a reference point of a camera (in general, a nodal point of an optical system). Reference symbols Q and Q' denote planes of projections on which an image of the object is projected when photographed. In this case, a cylinder P, the center of which coincides with the point O, is equivalent to a plane of projection when a panoramic image is photographed.

A plurality of images projected on the planes of projections Q and Q' are converted to images projected on the cylinder P, and the adjacent converted images are pasted together.

For example, FIG. 3A shows photograph images projected on the planes of projections Q and Q', and FIG. 3B shows images obtained by projecting. the photograph images on the cylinder P. When the images shown in FIG. 3B are synthesized by the conventional method, a panoramic image as shown in FIG. 3C is obtained.

FIG. 4 shows divisional images A, B and C obtained by photographing a linear object. When the divisional images A to C are simply synthesized, the resultant image is unnatural and nonlinear, as shown in FIG. 5. However, a natural image as shown in FIG. 6 can be obtained by the aforementioned cylindrical conversion process.

When images are pasted and synthesized to produce a panoramic image by the method described above, information on the angle of view of the camera is required in order to determine the diameter of the cylinder on which photographed images are projected. The information on the angle of view can be calculated from the focal distance of the camera and the size of the image pickup element. However, this matter is not known to people in general. Further, when an image is photographed by a camera with a zoom lens which has been widely used recently, only the longest and shortest focal lengths of the zoom lens can be known.

To overcome the above drawback, Japanese Patent Application No. 2871/98 discloses a method for calculating an angle of view from an overlapped region of two images pasted together.

FIGS. 7A and 7B are diagrams for explaining a cylindrical conversion process disclosed in Japanese Patent Application No. 2871/98. In the cylindrical conversion process, a plurality of images photographed in the angle of view $\alpha_x$ are converted to images projected on a cylindrical plane, as shown in the drawings. The coordinates of a point of an object projected on the cylinder are represented as $(\theta,Y)t$ in a cylindrical coordinates system and the coordinates of the point projected on a photograph plane are represented as $(x,y)p$. A point on the cylinder is represented by coordinates $(X,Y)t$, where X denotes a length along the cylindrical surface. When the unit of $\theta$ is radian, X is equal to $R \times \theta (X= R \times \theta)$.

Further, it is assumed that a reference point of the camera is $)t$, the origin on the sylindrical surface is C, the radius of the cylinder is R, the origin on the plane of projection on which a photographed image is projected is $Op=(\theta 0, 0)t$, the width of the photographed image is $W_x$, and the angle of view $\alpha_x$ is an angle of view in the X dorection (between the center and the end of the image). In this case, the radius R of the cylinder is represented by the following equation (1).

$$R=W_x/(2 \cdot \tan \alpha_x) \tag{1}$$

Further, the following relationship is established between $(x,y)p$ and $(\theta,Y)t$.

$$(x, y)p=(R \cdot \tan(\theta-\theta_0), Y/\cos(\theta-\theta_0)) \tag{2}$$

Based on these equations, $(x,y)p$ is converted to $(X,Y)t$, so that an image is produced on the cylinder by projecting the photographed image thereon.

According to Japanese Patent Application No. 2871/98, information on the angle of view is obtained in the following manner. FIG. 7B hows a state in which a camera mounted on a tripod (not shown) continuously photographs images of an object, while rotating by an angle $\beta$ relative to the object. The angle of view in the horizontal direction of the camera is $\alpha_x$, and the size of the photographed image is $W_x \times W_y$.

First, a part of the object included in both the adjacent images is selected as a characteristic point. The point in one image corresponding to the characteristic point in another image can be searched out by utilizing, for example, a method disclosed in Jpn. Pat. KOKAI Publication No. 6-141228.

It is assumed that the characteristic point is projected on the point $(\theta,Y)t$ on the cylinder, the origins of the two (left and right) images are $OL=(\theta_L,0)t$ and $OR=(\theta_R,0)t$, and the coordinates of the characteristic point on the photographed images are $(x_L,y_L)p$ and $(x_R,y_R)p$. In this case, the following relationship is established on the basis of the equation (2).

$$(x_L, y_L)p=(R \cdot \tan(\theta-\theta_L), Y/\cos(\theta-\theta_L)) \tag{3}$$

$$(x_R, y_R)p=(R \cdot \tan(\theta-\theta_R), Y/\cos(\theta-\theta_R)) \tag{4}$$

The following equation (5) is obtained from the equations (1), (3) and (4), so that the angle of view $\alpha_x$ is obtained.

$$\tan \alpha x = \sqrt{\frac{y_L^2 - y_R^2}{y_L^2 \cdot A_R^2 - y_R^2 \cdot A_L^2}} \tag{5}$$

$$A_R=2 \cdot x_R/W_x, A_L=2 \cdot x_L/W_x$$

At the same time, the difference in angle in the direction of the camera, $\beta=(\theta-\theta_R)-(\theta-\theta_L)$ is obtained by the following equations (6) and (7).

$$\tan(\theta - \theta_L) = \frac{2 \cdot x_L}{W_x} \cdot \tan\alpha_x \quad (6)$$

$$\tan(\theta - \theta_R) = \frac{2 \cdot x_R}{W_x} \cdot \tan\alpha_x \quad (7)$$

As described above, since the angle of view can be automatically obtained from images having overlapped regions, a choice of camera types used to produce a panoramic image can be increased. In the method described above, the angle of view $\alpha_x$ is obtained from the characteristic point and the corresponding point of the two adjacent images. However, if the angle of view is determined by the method of least square, using a greater number of points, influences of errors due to the search of the corresponding point or noises in images can be reduced.

However, the method for calculating the angle of view described in Japanese Patent Application No. 2871/98 has the following problems. Since the process of pasting two images is required, it takes a considerable time to calculate the angle of view. In addition, information on the angle of view cannot be accurate, since it is calculated in an estimate.

BRIEF SUMMARY OF THE INVENTION

It is accordingly an object of the present invention to provide a camera system, which can calculate an angle of view quickly and accurately and produces a natural and accurate panoramic image.

To achieve the above object, according to a first aspect of the present invention, there is provided a camera system comprising:

a camera including a photographing device for photographing an object, and a recording medium for storing divisional images of the object photographed by the photographing device and information relating to an angle of view of photographing; and a panoramic image synthesizing apparatus for performing a cylindrical conversion process based on the divisional images stored in the recording medium and the information relating to the angle of view, and synthesizing cylindrically converted images to produce a panoramic image.

According to a second aspect of the present invention there is provided a camera system comprising:

a camera including a photographing device for photographing an object, and a detachable recording medium for storing divisional images of the object photographed by the photographing device and information relating to an angle of view of photographing; and a panoramic image synthesizing apparatus including: an image information reading section for reading the divisional images and the information relating to an angle of view of photographing stored in the recording medium loaded in the panoramic image synthesizing apparatus; an angle-of-view calculating section for calculating an angle of view of each of the divisional images using the information relating to an angle of view of photographing read by the image information reading section; a cylindrical conversion section for cylindrically converting each of the divisional images using the angle of view calculated by the angle-of-view calculating section; and an image synthesizing section for synthesizing the cylindrically converted divisional images converted by the cylindrical conversion section to produce a panoramic image.

According to a third aspect of the present invention, there is provided a computer-readable recording medium storing programs to cause a computer to execute a panoramic image synthesizing process comprising the steps of:

reading a plurality of images for constituting a panoramic image recorded in a camera and information relating to an angle of view of photographing in panoramic photography; and synthesizing a panoramic image by a cylindrical conversion process based on the plurality of images for constituting a panoramic image and information relating to an angle of view of photographing in panoramic photography.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described in detail with reference to the accompanying drawings.

Figure 1:
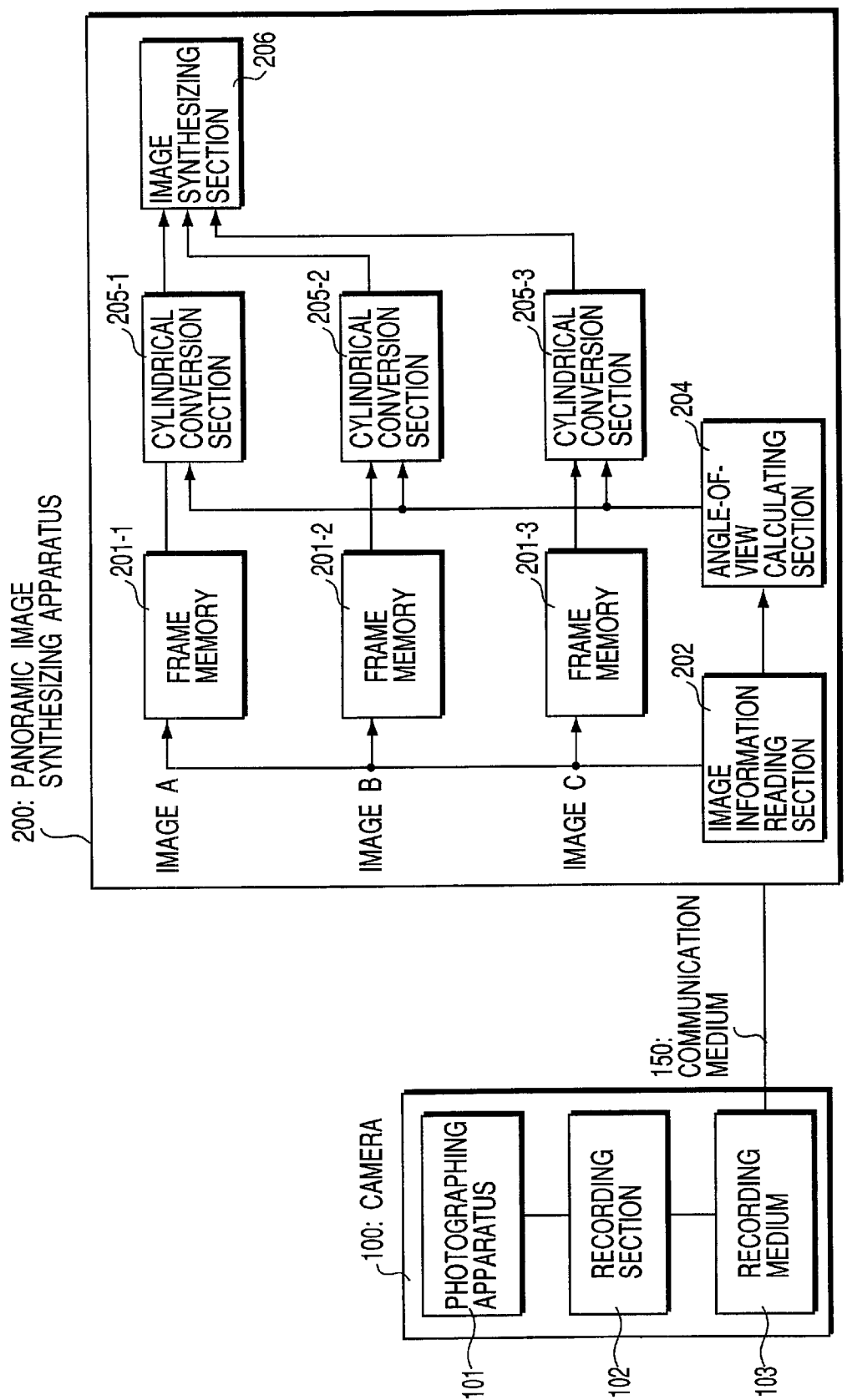
FIG. 1 is a diagram showing a structure of a camera system according to an embodiment of the present invention.
Figure 2:
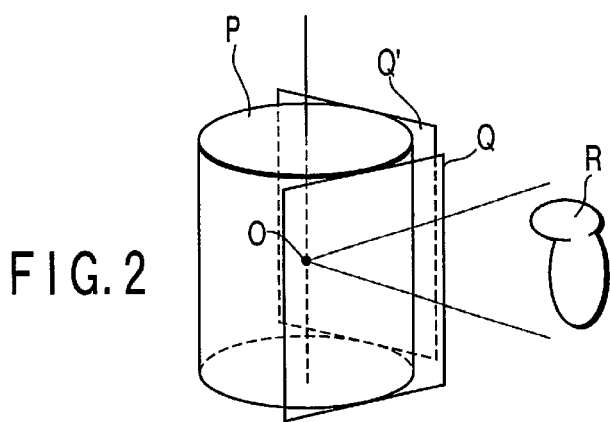
FIG. 2 is a diagram for explaining a basic principle of the cylindrical conversion process.
Figure 3A:
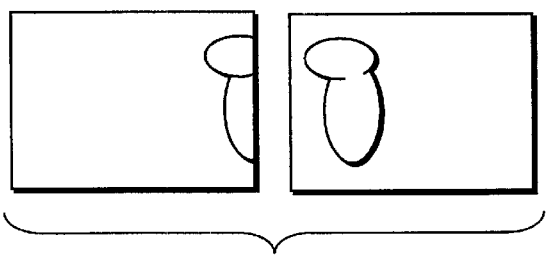
FIG. 3A is a diagram showing photograph images projected on the planes of projections Q and Q'.
Figure 3B:
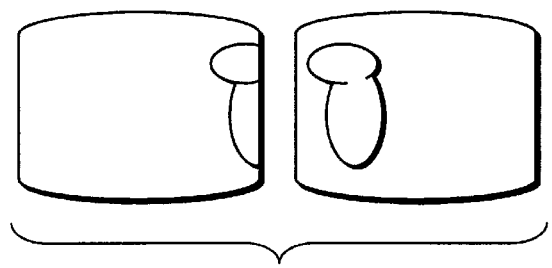
FIG. 3B is a diagram showing images obtained by projecting the photograph images shown in FIG. 3A on a cylinder P shown in FIG. 2.
Figure 3C:
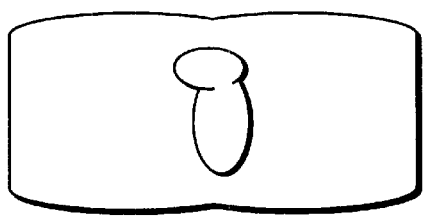
FIG. 3C is a diagram showing a synthesis image obtained by synthesizing the images shown in FIG. 3B.
Figure 4:
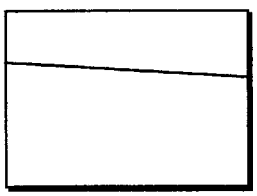
FIG. 4 is a diagram showing divisional images A, B and C obtained by photographing a linear object.
Figure 4:
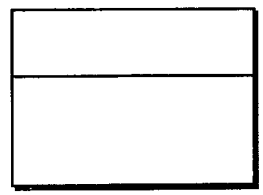
Figure 4:
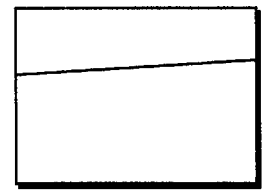
Figure 5:
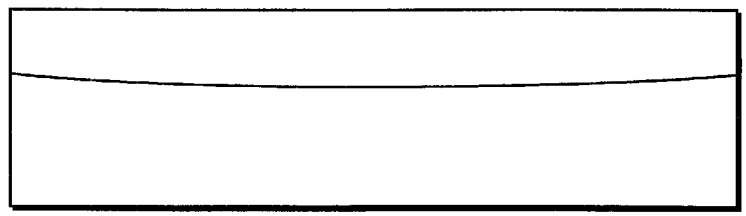
FIG. 5 is a diagram showing a panoramic synthesis image obtained without using the cylindrical conversion process.
Figure 6:
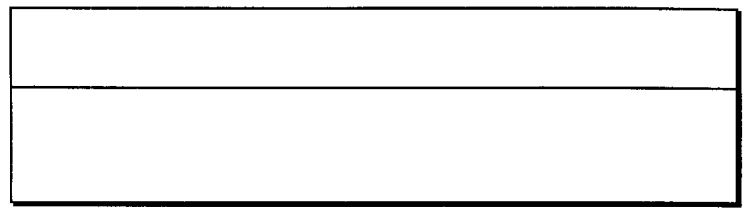
FIG. 6 is a diagram showing a panoramic synthesis image obtained by using the cylindrical conversion process.
Figures 7A, 7B:
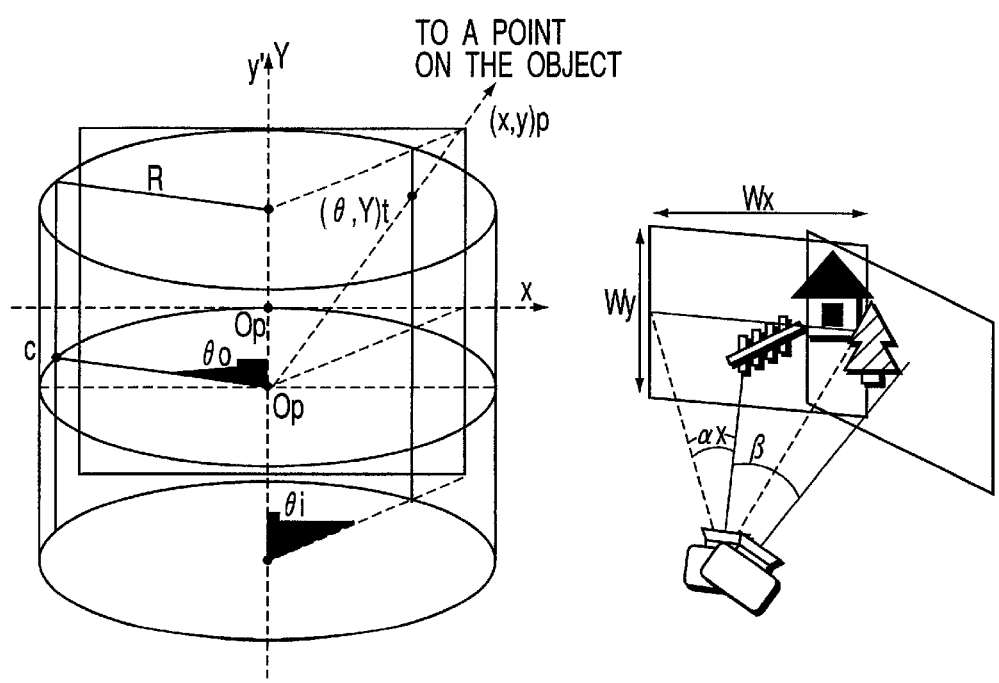
FIGS. 7A and 7B are diagrams for explaining a method for calculating the angle of view necessary for the cylindrical conversion process, in which two images are pasted together and the angle of view is calculated form the overlapped region of the pasted images.

FIG. 1 is a diagram showing a structure of a camera system according to an embodiment of the present invention. The camera system comprises a camera 100 and a panoramic image synthesizing apparatus 200 connected to the camera 100 via a communication medium 150.

The camera 100 comprises a photographing apparatus 101 for photographing an object and a recording section 102. The recording section 102 records on a recording medium 103 a plurality of (in this embodiment, three) divisional images of the object continuously photographed by the photographing apparatus 101. The section also records, as header information for each divisional image, information on the angle of view of photographing an image (in this embodiment, the size (diagonal length) of a CCD serving as an image pickup element and the focal length of the lens). The recording medium 103 may be of a detachable type.

The panoramic image synthesizing apparatus 200 comprises an image information reading section 202, frame memories 201-1 to 201-3, an angle-of-view calculating section 204, cylindrical conversion sections 205-1 to 205-3, and an image synthesizing section 206. The image information reading section 202 reads information on the angles of view of the three photographed images transmitted via the communication medium 150. It records the read information on the images, as an image A in the frame memory 201-1, as an image B in the frame memory 201-2, and as an image C in the frame memory 201-3. In the case where the recording medium 103 is detachable, the recording medium 103 may be removed from the camera 100 and inserted in a mounting section of the panoramic image synthesizing apparatus 200, so that the internal information can be read by the image information reading section 202. In this case, the communication medium 150 is unnecessary.

The header information relating to the angle of view read from the recording medium is transmitted to the angle-of-view calculating section 204. The angle-of-view calculating section 204 calculates the angle of view of each image by means of the following equations based on the information relating to the angle of view, i.e., the diagonal length of the CCD and the focal length of the lens.

(1) In the case of a horizontal image $$\text{Angle of View} = 2 \times \tan^{-1}\left(\frac{\text{Diagonal Length of } CCD}{2 \times \text{Focal Length of Lens} \times \sqrt{1 + \frac{h^2}{w^2}}}\right)$$

(2) In the case of a vertical image $$\text{Angle of View} = 2 \times \tan^{-1}\left(\frac{\text{Diagonal Length of } CCD}{2 \times \text{Focal Length of Lens} \times \sqrt{1 + \frac{w^2}{h^2}}}\right)$$

In the above equations, w represents a width of an image output from the CCD and h represents a height thereof.

The cylindrical conversion sections 205-1 to 205-3 cylindrically convert the images A to C, respectively, using the information on the angle of view calculated by the angle-of-view calculating section 204. The image synthesizing section 206 synthesizes the images obtained by cylindrically converting the images A to C and produces a panoramic image.

As described above, according to this embodiment, the information relating to the angle of view of images necessary for the cylindrical conversion process is recorded in the recording medium on the side of the camera as header information of each image. Therefore, the panoramic image synthesizing apparatus 200 need not perform the process for pasting two images to calculate the angle of view unlike in the conventional art. As a result, the speed of the panoramic image synthesizing process is increased. Moreover, in the conventional method, the angle of view cannot be accurate, since it is calculated in an estimate. In contrast, in the method of this embodiment, the information on the angle of view obtained when the image is actually photographed by the camera is recorded. Therefore, the angle of view can be calculated accurately. Further, the cylindrical conversion process can be performed easily even by means of another type of camera.

In the embodiment described above, the size of the CCD (the diagonal length of the CCD) and the focal length of the lens are recorded in the recording medium 103 as header information of each image. However, since the size of the CCD can be determined depending on the type of the camera, it need not be recorded in the recording medium 103, but may be selected by the panoramic image synthesizing apparatus 200 in accordance with the camera. In this case, it is only necessary that the recording medium 103 record the focal length of the camera. Instead of the diagonal length of the CCD, the longitudinal or lateral length of the CCD may be recorded on the recording medium 103.

According to the present invention, the process of calculating the angle of view can be performed quickly and accurately. Thus, it is possible to provide a camera system which can produce a natural and accurate panoramic image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera system comprising:

a camera including a photographing device for photographing an object, and a detachable recording medium for storing divisional images of the object photographed by the photographing device and information relating to an angle of view of photographing; and a panoramic image synthesizing apparatus including: an image information reading section for reading the divisional images and the information relating to an angle of view of photographing stored in the recording medium loaded in the panoramic image synthesizing apparatus; an angle-of-view calculating section for calculating an angle of view of each of the divisional images using the information relating to an angle of view of photographing read by the image information reading section; a cylindrical conversion section for cylindrically converting each of the divisional images using the angle of view calculated by the angle-of-view calculating section; and an image synthesizing section for synthesizing the cylindrically converted divisional images converted by the cylindrical conversion section to produce a panoramic image, wherein the angle-of-view calculating section calculates an angle of view of each of the divisional images by means of an arithmetic formula using a focal length of a lens, a size of a CCD and a size of an image output from the CCD as parameters.

2. A camera system according to claim 1, wherein the size of the CCD is a diagonal length of the CCD.

* * * * *